J. M. THOMPSON.
TOY VEHICLE.
APPLICATION FILED DEC. 9, 1907.
905,955.
Patented Dec. 8, 1908.
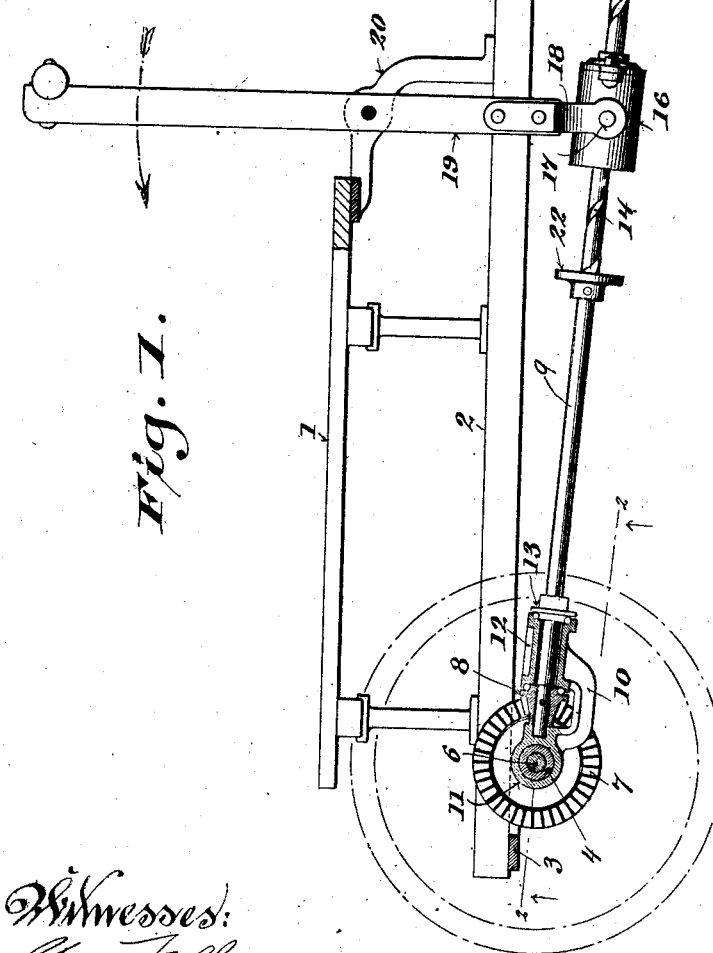
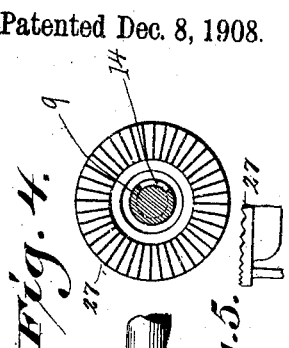
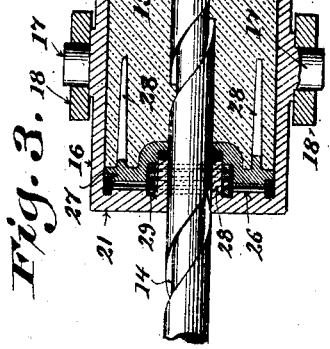
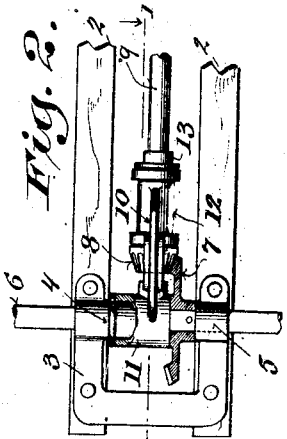

UNITED STATES PATENT OFFICE.

JAMES M. THOMPSON, OF MILWAUKEE, WISCONSIN, ASSIGNOR TO LUTHER BROS. CO., OF MILWAUKEE, WISCONSIN.

TOY VEHICLE.

No. 905,955.        Specification of Letters Patent.        Patented Dec. 8, 1908.

Application filed December 9, 1907. Serial No. 405,712.

*To all whom it may concern:*

Be it known that I, JAMES M. THOMPSON, citizen of the United States, and resident of Milwaukee, in the county of Milwaukee and State of Wisconsin, have invented certain new and useful Improvements in Toy Vehicles; and I do hereby declare that the following is a full, clear, and exact description thereof.

My invention has for its object to provide simple, economical and effective propelling-mechanism for toy-vehicles, and it consists in certain peculiarities of construction and combination of parts as hereinafter fully described with reference to the accompanying drawings and subsequently claimed.

In the drawings: Figure 1 represents a sectional elevation of a toy-vehicle embodying the features of my invention, the section being partly indicated by line 1—1 of Fig. 2; Fig. 2, a detail inverted plan view of the transmission-gearing partly in section, as indicated by line 2—2 of Fig. 1; Fig. 3, an enlarged detail sectional view of an assembled nut with a portion of the spirally grooved spindle fitted therein, the nut and spindle constituting the propelling means through which motion is imparted to the transmission gear; Fig. 4, a detail end view of the nut member proper illustrating its corrugated face-plate with the spindle thereof in section, and Fig. 5, a fragmental elevation of the corrugated face-plate.

Referring by numerals to the drawings, 1 indicates a seat-board secured by standards to a truck-frame 2, the same being provided at its rear with a yoke 3 having bearings 4, 5, for an axle 6, which axle is revolubly mounted therein. The said axle carries the usual traction-wheels, as indicated by dotted lines in Fig. 1, and also a bevel gear-wheel 7 secured thereto between the bearings 5, 6, which gear-wheel meshes with a bevel-pinion 8 that is fast on a driving-spindle 9. A bracket 10, having a sleeve 11 loosely mounted upon an extension of the bearing 4, serves as a support for the spindle, the bracket being provided with a box 12 through which said spindle extends, its end resting in a socket that projects from the sleeve portion of the aforesaid bracket.

The box 12 of the bracket is formed with ball-recesses at either end for the reception of two series of balls one of which series is held in position by a cone-extension of the bevel pinion, while the other series is retained by a cone collar 13 secured to the spindle, thus constituting an anti-friction bearing for the latter, which bearing at the same time receives end-thrust of said spindle in either direction.

The construction of bracket and manner of mounting the same permits oscillation of the spindle about the axis of the driven axle 6, which action at the same time does not interfere with the meshing of the transmission gears, the sleeve 11 being mounted upon the bearing 4, in place of directly upon the axle also prevents undue friction of the meshed parts, which would otherwise occur owing to rotation of said axle.

The forward end of the spindle is provided with a quick-thread consisting of a spiral-groove 14 for the reception of a nut 15, which nut is run on said spindle and incased in a housing 16 having studs 17 projecting therefrom for the reception of a spanner 18 that is secured to a lever 19. The lever is fulcrumed in a bracket 20 which is secured to the forward end of the vehicle-truck and also to the seat-board, said lever being provided at its free end with a cross-bar constituting a handle, by means of which an oscillatory motion is imparted to the aforesaid lever causing a reciprocation of the nut and its housing upon the spindle to rotate the latter. The rear face 21 of the housing is adapted to engage a disk 22, which disk is secured to the spindle at the termination of its threaded portion. The disk together with the housing face constitute break members that coact to retard motion of the spindle when the said members are brought in contact by the operator, there being a collar 23 secured to the end of the said spindle to limit the forward motion of the nut, although in some instances the collar may be dispensed with. The forward end of the truck-frame carries a hanger 24 that has pivotally secured thereto the forward axle 25, on which are mounted the front wheels of the vehicle, the said axle being swung on its pivot under control of the operator's feet, all of which construction constitutes no part of my invention.

As best shown in Fig. 3 of the drawings, the housing 16 consists of a cylindrical hollow cup, the rear face 21 of which constitutes its bottom, the inner face being provided with radially disposed serrations 26, that are adapted to engage a similarly serrated hardened metal plate 27. This plate is cast integral with the cylindrical nut 15, which nut is loosely fitted into the housing and is preferably composed of Babbitt-metal, there being prongs 28 extending into said nut from the plate, so as to insure perfect union of the parts. The nut is molded with a central aperture conforming to the spiral grooves of the spindle, the integral plate 27 thereof being also apertured and radially recessed for the reception of a hub 28, which projects therein from the housing and forms a bearing therefor upon the spindle. A spiral spring 29 surrounds the hub 28, being interposed between the bottom of said housing and face of the plate 27. This spring is provided to cause disengagement of the serrated faces of the aforesaid housing and nut at such time as the housing is at rest, or when the vehicle is backed by hand, thus uncoupling the said serrated faces which otherwise operate as clutch members to prevent rotation of the nut, it being understood that when said vehicle is backed the bevel gears become drivers and impart motion to the spindle, which spindle could not rotate if the nut and housing were in clutch-connection. The housing is closed by a cap 30 having an aperture through which the spindle extends and is recessed to form an interior seat for antifriction balls, that are nested about a loose cone 31 interposed between the adjacent end of the nut and cap face, there being lugs extending from said housing and cap for the reception of retaining bolts.

From the foregoing description, it will be seen that should the lever 19 be pulled in the direction of the arrow, the nut-housing would first have a slight longitudinal movement in the reverse direction independent of the nut. This movement will cause locking engagement of the clutch-members of said housing and nut after which the said parts move together, the nut being now locked against rotation causes the spindle on which it slides to rotate and through its transmission gear, thus propel the vehicle forward. Upon reversal of the lever the nut immediately disengages the housing and will revolve idly, permitting said vehicle to travel forward on its own momentum. Should the operator desire to slow down or stop, the reverse motion of the nut is continued until the face 21 of the housing contacts with the disk 22, thus forming a brake to retard rotation of the spindle, the pressure being regulated by the lever. This construction also permits the vehicle to be used as a "coaster" with safety, the lever, nut, and spindle being also a very desirable means for propelling, for the reason that the driving strokes of the lever may be of varying length, while with the crank transmission, which is used in toys of this kind the strokes must be exact, and in coasting the lever in this case is under constant vibration.

In place of gearing the spindle-mechanism to the rear vehicle-axle, in some instances I prefer to gear the same to the front axle, in which case said spindle inclines upward towards the driver in such a position that the housing could be actuated by a pair of handles connected directly thereto.

I claim:

1. A toy vehicle comprising a truck having front and rear wheel-carrying axles, a bevel gear-wheel secured to the rear axle, a swinging bracket mounted concentric with said rear axle, a spindle revolubly mounted and supported in the bracket, a bevel-pinion secured to the spindle in mesh with the bevel gear-wheel, a thread upon the spindle, a rotatory nut engaging the threaded portion of said spindle, a non-rotatable housing for the nut, means for permitting locking engagement of the nut and housing, and a lever in connection with the housing fulcrumed to the vehicle-truck, whereby the front end of the aforesaid spindle is supported.

2. In a toy vehicle comprising a truck having front and rear wheel-carrying axles, the combination of a threaded spindle in gear-connection with one of the axles, the spindle being longitudinally disposed with relation to the vehicle, a rotatory nut mounted upon the spindle, a non-rotatory housing for the nut, means for imparting reciprocative motion to the housing, clutching mechanism for engaging said nut and housing, and a brake-member carried by said spindle adapted to be engaged by the aforesaid housing.

3. A propelling-mechanism for vehicles comprising a threaded spindle, a rotatory nut carried by the spindle, a non-rotatory housing for the nut, means in connection with the housing and nut for locking said nut against rotation, means for imparting longitudinal reciprocation to said housing and nut, and a brake-member carried by said spindle adapted to be engaged by the aforesaid housing.

4. In a toy-vehicle having front and rear wheel-carrying axles, and a truck mounted thereon; the combination of a threaded spindle in gear-connection with one of the axles, the spindle being longitudinally disposed with relation to the vehicle, a rotatory nut mounted upon the spindle, a non-rotatory housing for the nut, means for permitting locking engagement of the nut and housing, means for imparting reciprocation to said housing, and a brake-member carried by said spindle, adapted to be engaged by the aforesaid housing.

In testimony that I claim the foregoing I have hereunto set my hand at Milwaukee in the county of Milwaukee and State of Wisconsin in the presence of two witnesses.

JAMES M. THOMPSON.

Witnesses:
 GEORGE FELBER,
 RALPH NELSON.